(12) United States Patent
Knecht

(10) Patent No.: US 9,163,777 B1
(45) Date of Patent: Oct. 20, 2015

(54) LIFTING LITTER BOX

(71) Applicant: Judith M. Knecht, New York, NY (US)

(72) Inventor: Judith M. Knecht, New York, NY (US)

( * ) Notice: Subject to any disclaimer, the term of this patent is extended or adjusted under 35 U.S.C. 154(b) by 0 days.

(21) Appl. No.: 14/303,841

(22) Filed: Jun. 13, 2014

(51) Int. Cl.
  *A01K 1/01* (2006.01)
  *F16M 11/24* (2006.01)

(52) U.S. Cl.
  CPC ............... *F16M 11/24* (2013.01); *A01K 1/011* (2013.01); *A01K 1/0107* (2013.01); *A01K 1/0114* (2013.01); *A01K 1/0125* (2013.01)

(58) Field of Classification Search
  CPC ... A01K 1/0114; A01K 1/011; A01K 1/0125; A01K 1/0107
  See application file for complete search history.

(56) References Cited

U.S. PATENT DOCUMENTS

| | | | | |
|---|---|---|---|---|
| 5,390,628 A | * | 2/1995 | Vito | 119/170 |
| 6,289,847 B1 | * | 9/2001 | Carlisi | 119/166 |
| 7,487,743 B1 | * | 2/2009 | Lane | 119/166 |
| 8,104,725 B1 | * | 1/2012 | Kebre | 248/188.5 |

* cited by examiner

*Primary Examiner* — Kristen C Hayes
(74) *Attorney, Agent, or Firm* — The Law Office of Jerry D. Haynes

(57) ABSTRACT

A lifting litter box comprising a base, where the base includes a lifting mechanism; a frame secured above the base, where the frame is lifted and lowered by the lifting mechanism; and a litter box positioned atop the frame, where the lifting mechanism lifts the litter box to an extended position for cleaning and then lowers the litter box once clean. The lifting mechanism may be battery operated and/or manually operated to enable lifting anytime desired by the user.

16 Claims, 2 Drawing Sheets

LIFTING LITTER BOX

BACKGROUND OF THE INVENTION

1. Field of the Invention

The present invention relates to a litter box with a lifting device to raise the box thereby allowing easier disposal and cleaning of the inner contents.

2. Description of Related Art

Owning a pet provides a loving and lasting relationship between the animal and their owner. Along with the love is the responsibility of cleaning the animal's untidiness and waste. Cats and even some trained dogs use litter boxes as their preferred place to deposit their waste.

The litter in the box creates a solid mass once wet to make discarding any waste simple and convenient. This way the pet is able to remain indoors to relieve themselves, never having to go outdoors.

A common problem encountered is that cleaning the litter boxes is tedious requiring the pet owner to repeatedly bend over when scooping the litter waste. Many times this is difficult for elderly owners or those with back injuries, because they must strain and twist into uncomfortable positions for such a simple task. To address this issue, some litter boxes are self-cleaning automatically scooping the waste into a provided waste receptacle. While this is helpful, the user is still required to bend over to reach the receptacle and discard the waste, thereby causing strain and stress on the user's back.

Therefore, it would be beneficial in the art to provide a litter box that assists the user when cleaning a litter box. It would also be desirable in the art to provide a litter box that is elevated to position the box at a more convenient level for the user when cleaning.

SUMMARY OF THE INVENTION

In view of the foregoing disadvantages inherent in the prior art, the general purpose of the present invention is to provide a lifting litter box to easily raise a litter box for cleaning, configured to include all of the advantages of the prior art, and to overcome the drawbacks inherent therein.

Accordingly, an object of the present invention is to provide a lifting litter box with an internal lifting mechanism to raise the litter box to a level convenient for the user to discard the waste.

Another object of the present invention is to provide a lifting litter box with a mechanical lifting mechanism to easily lift and lower the litter box.

To achieve the above objects, in an aspect of the present invention, a lifting litter box is described comprising a base, where the base includes a lifting mechanism; a frame secured above the base, where the frame is lifted and lowered by the lifting mechanism; and a litter box positioned atop the frame, where the lifting mechanism lifts the litter box to an extended position for cleaning and then lowers the litter box once clean. The lifting mechanism may be battery operated and/or manually operated to enable lifting anytime desired by the user.

These together with other aspects of the present invention, along with the various features of novelty that characterize the present invention, are pointed out with particularity in the claims annexed hereto and form a part of this present invention. For a better understanding of the present invention, its operating advantages, and the specific objects attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE DRAWINGS

The present invention relates to a litter box with a lifting device to raise the box thereby allowing easier disposal and cleaning of the inner contents. The present invention provides a lifting litter box to provide an easy to clean litter box that requires no bending or straining when removing material from the box. The lifting litter box includes a base with a lifting mechanism. Upon the lifting mechanism is a frame which supports a litter box. During use, the lifting mechanism within the base raises the litter box to a level that is easily attainable for the user.

Figure 1:
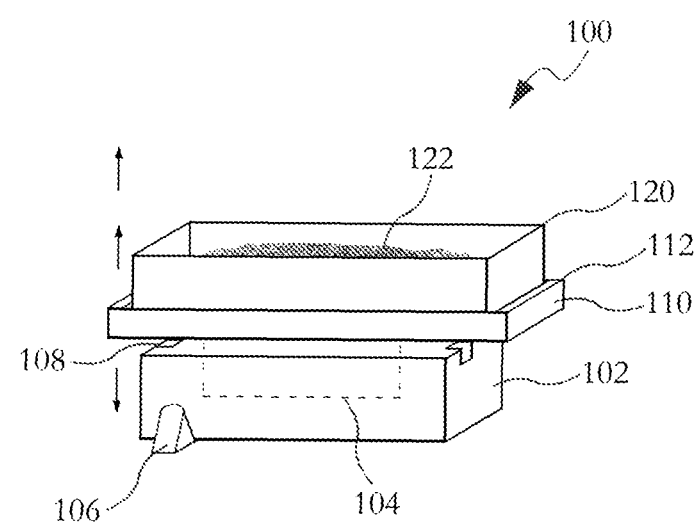
FIG. 1 depicts a perspective view of a lifting litter box in accordance with an exemplary embodiment of the present invention.

Turning now descriptively to the drawing, FIG. 1 shows a lifting litter box 100 in accordance with an exemplary embodiment of the present invention. The lifting litter box 100 includes a base 102 upon which a frame 110 rests. Within the base 102 is a lifting mechanism 104. The lifting mechanism 104 raises and lowers the frame 110. The frame 110 may be locked onto the base 102 with a pair of clamps 108. The clamps 108 ensure that the frame 110 does not tilt or shift during use.

The lifting mechanism 104 may be have an electric or hydraulic motor, and may plug into a wall outlet or be battery operated. Extending from the base 102 is a foot pedal 106 to lift and lower the frame 110. The foot pedal 106 may include two pedals, one for lifting and one for lowering. Additionally, the lifting mechanism 104 may be a manually actuated pump device that moves when the pedal 106 is repeatedly pressed this way even if the battery is dead or the automatic hydraulic motor is not functioning the user is able to raise the frame. Before operating the lifting mechanism 104 the user must unfasten the clamps 108 to release the frame 110 from the base 102.

The frame 110 includes a lip 112 to support and contain a litter box 120. The litter box 120 is easily removable from the frame 110 so that when the lifting mechanism 104 is extended the user removes the litter box 120 for cleaning. Once clean, the litter box 120 is replaced upon the frame 110 and lowered against the base 102. The clamps 108 are fastened for use again by the animal.

The lifting litter box 100 may be completely made of plastic or a lightweight metal like aluminum. The frame 110 may measure 21¾ inches in width, 17 inches in length, and 6 inches in height. The lifting litter box 100 permits pet owner to clean up their pet's litter and waste without bending, crouching or straining. The internal lifting mechanism 104 may be electrically and/or manually operated to enable use anytime. With the lifting litter box 100 the user is afforded an easy to use, easy to clean device that takes away the trouble associated with other boxes.

Figure 2:
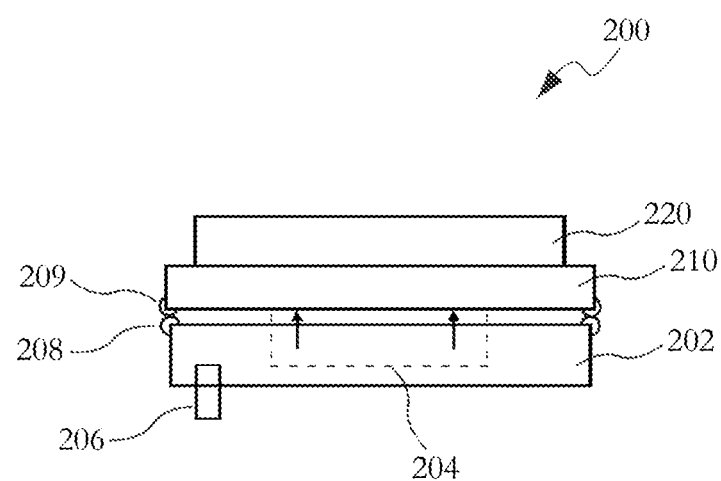
FIG. 2 depicts a side view of a lifting litter box in accordance with an alternative embodiment of the present invention.

Referring now to FIG. 2, a perspective view of an alternative embodiment of the lifting litter box 200 is shown. The alternative embodiment is the same as the first embodiment including the base 202, lifting mechanism 204, foot pedal 206, and litter box 220. The lifting litter box 200 may include a frame 210 that is the same width and size as the base 202, so that the edges align all around the lifting litter box 200. At the edges of both the base 202 and the frame 210 are a set of clamps; a first pair of clamps 208 attached to the base 202 to fasten to a second pair of clamps 209 attached to the frame 210. This way the frame 210 is more securely coupled to the base 202 to ensure that it does not slide, tilt or fall. For cleaning, the user simply unfastens the clamps 208, 209 to enable easy lifting of the frame 210 and litter box 220 on the lifting mechanism 204.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

What is claimed is:

1. A lifting litter box comprising:
   a. a base, where the base includes a lifting mechanism and a foot pedal to activate the lifting mechanism;
   b. a frame secured above the base, where the frame is lifted and lowered by the lifting mechanism; and
   c. a litter box positioned atop the frame, where the lifting mechanism lifts the litter box to an extended position for cleaning and then lowers the litter box once clean.

2. The lifting litter box according to claim 1, where the lifting mechanism includes a hydraulic motor.

3. The lifting litter box according to claim 1, where the lifting mechanism includes an electric motor.

4. The lifting litter box according to claim 1, where the lifting mechanism is battery powered.

5. The lifting litter box according to claim 1, where the lifting mechanism is manually operated.

6. The lifting litter box according to claim 1, where the base includes a pair of clamps to secure the frame against the base.

7. The lifting litter box according to claim 1, where the frame is the same width as the base.

8. The lifting litter box according to claim 7, where the base includes a first pair of clamps and the frame includes a second pair of clamps, where the first pair of clamps couple with the second pair of clamps to secure the frame against the base.

9. A lifting litter box comprising:
   a. a base, where the base includes a lifting mechanism and a foot pedal to activate the lifting mechanism, where the foot pedal includes two pedals, one pedal to lift and one pedal to lower the frame;
   b. a frame secured above the base, where the frame is lifted and lowered by the lifting mechanism; and
   c. a litter box positioned atop the frame, where the lifting mechanism lifts the litter box to an extended position for cleaning and then lowers the litter box once clean.

10. The lifting litter box according to claim 9, where the lifting mechanism includes a hydraulic motor.

11. The lifting litter box according to claim 9, where the lifting mechanism includes an electric motor.

12. The lifting litter box according to claim 9, where the lifting mechanism is battery powered.

13. The lifting litter box according to claim 9, where the lifting mechanism is manually operated.

14. The lifting litter box according to claim 9, where the base includes a pair of clamps to secure the frame against the base.

15. The lifting litter box according to claim 9, where the frame is the same width as the base.

16. The lifting litter box according to claim 15, where the base includes a first pair of clamps and the frame includes a second pair of clamps, where the first pair of clamps couple with the second pair of clamps to secure the frame against the base.

* * * * *